United States Patent
Goossens

[11] Patent Number: 5,585,560
[45] Date of Patent: Dec. 17, 1996

[54] SEALED MOVEMENT SENSOR

[75] Inventor: André F. L. Goossens, Rumst, Belgium

[73] Assignee: Alfred Teves Metallwarenfabrik GmbH & Co. OHG, Germany

[21] Appl. No.: 443,304

[22] Filed: May 17, 1995

Related U.S. Application Data

[63] Continuation of Ser. No. 108,745, filed as PCT/EP92/02865, Dec. 11, 1992, published as WO93/14372, Jul. 22, 1993, abandoned.

[30] Foreign Application Priority Data

Jan. 20, 1992 [DE] Germany .................. 42 01 328.3

[51] Int. Cl.⁶ .................. G01P 3/48; G01P 3/54
[52] U.S. Cl. .................. 73/494; 324/174; 324/166; 384/448
[58] Field of Search ........... 73/494, 493; 324/174, 324/173, 207.15, 207.25, 166; 384/448; 174/52.2, 52.3

[56] References Cited

U.S. PATENT DOCUMENTS

| | | | |
|---|---|---|---|
| 4,161,120 | 7/1979 | Cloarec | 73/494 |
| 4,904,936 | 2/1990 | Richmond | 324/174 |
| 4,907,445 | 3/1990 | Okumura | 324/174 |
| 4,994,739 | 2/1991 | Honda et al. | 324/207.14 |
| 5,004,980 | 4/1991 | Ida et al. | 324/166 |
| 5,014,005 | 5/1991 | Murata et al. | 324/174 |
| 5,140,261 | 8/1992 | Seo et al. | 324/173 |
| 5,254,807 | 10/1993 | Pfander et al. | 324/173 |

FOREIGN PATENT DOCUMENTS

| | | |
|---|---|---|
| 0194213A1 | 2/1986 | European Pat. Off. . |
| 0233346A1 | 12/1986 | European Pat. Off. . |
| 0321600A1 | 12/1987 | European Pat. Off. . |
| 0384014A2 | 11/1989 | European Pat. Off. . |
| 0400204A1 | 12/1990 | European Pat. Off. . |
| 0464403A1 | 6/1991 | European Pat. Off. . |
| 0446440A2 | 1/1992 | European Pat. Off. . |
| 2243331C2 | 9/1972 | Germany . |
| 2755379 | 12/1977 | Germany . |
| 3730184A | 9/1987 | Germany . |
| 3809886A1 | 3/1988 | Germany . |
| 3835955A1 | 10/1988 | Germany . |
| 3908854C2 | 3/1989 | Germany . |
| 3931948A1 | 9/1989 | Germany . |
| 3930702A1 | 9/1989 | Germany . |
| 3827937A1 | 2/1990 | Germany . |
| 4103947A1 | 8/1992 | Germany . |
| WO9102983 | 6/1991 | WIPO . |
| WO9104494 | 10/1991 | WIPO . |

OTHER PUBLICATIONS

Patent Abstracts of Japan, P-1058 Jun. 8, 1990, Vo. 14/No. 267.

Primary Examiner—Hezron E. Williams
Assistant Examiner—Helen C. Kwok
Attorney, Agent, or Firm—J. Gordon Lewis; Thomas N. Twomey

[57] ABSTRACT

The invention relates to a sensor for the measurement of movement, with a preferably rotarily movable transmission unit (rotor) for indicating movement and with a stationary device (stator) for the generation of an electric signal for sensing the movement of the transmission unit. The measuring device includes a measuring element which is fixed within a measuring element chamber defined by a two-part housing. A carrier housing fixes the measuring device relative to the transmission unit and accommodates electric connections from the measuring device and surrounds the two-part housing at least in part.

6 Claims, 2 Drawing Sheets

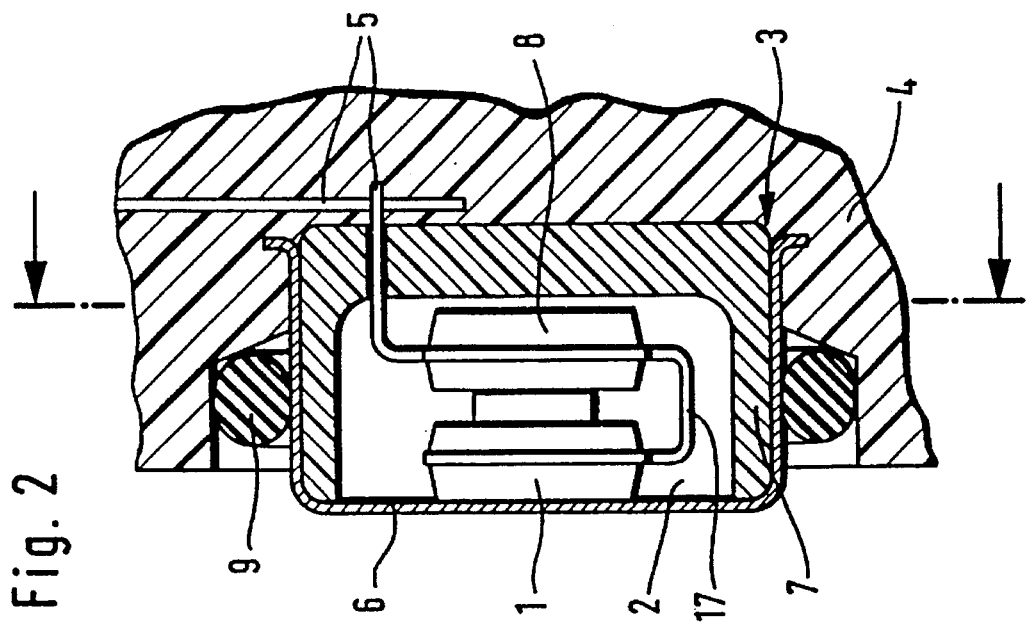
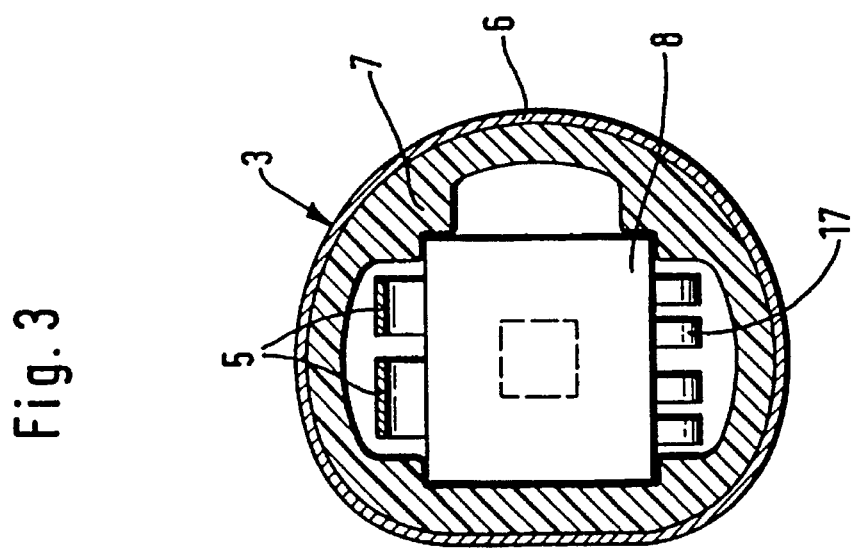

SEALED MOVEMENT SENSOR

This is a continuation of application, Ser. No. 08/108,745, filed as PCT/EP02/02865, Dec. 11, 1992, published as WO93/14372, Jul. 22, 1993, now abandoned.

TECHNICAL FIELD

The invention relates to sensors for the measurement of mechanical variables of movement, in particular to an angle-of-rotation sensor for automotive vehicle brake units furnished with traction slip control system and/or to be used for vehicle steering control systems and for vehicle chassis control systems.

BACKGROUND OF THE INVENTION

Sensors having the function of rate-of-revolutions sensors are explained, for example, in the series of publications by Messrs. Robert Bosch GmbH, "PKW-Bremsanlagen mit ABS" (Passenger Car Brake Units with Anti-lock System), first edition of September 1989, page 20. These rate-of-revolution sensors operate by the induction principle. The housing is either fabricated from a stainless steel casing or of plastics material, a chisel pole or a rhombic pole as the assembly position of the sensor may be and projecting from the housing being directed to an impulse wheel fixed to the wheel hub. The pole stud is furnished with a permanent magnet within the housing which as an essential component of the measuring element generates a magnetic field and of the induction of a voltage within the coil winding positioned on the pole stud as soon as there is a rotation of the impulse wheel.

The rate-of-revolutions sensors described above have, however, the disadvantage that special provisions are required in order to ensure a smooth functioning which must, among others, protect the sensor against mud and moisture. This includes the greasing of the sensor and the exact adjustment of the gap between the impulse wheel and the sensor. In addition, the relatively insufficient miniaturization and the comparatively heavy weight of the prior-art sensors contrasts with the requirement of an optimum integratability.

It is, therefore, the object of the invention to create a sensor of the kind mentioned above which is distinguished by a particular suitability for miniaturization, by a great versatility and integratability and which, without being sensitive to mud and splash water, ensures a signal processing at any time, without particular adjusting procedures and corrosion protecting measures being required.

According to the invention, this object is achieved by a process for the manufacture of such a sensor.

The embodiments of the invention are enunciated which will be illustrated and explained in more detail in the following in conjunction with the further features and advantages of the invention, making reference to several accompanying drawings (FIGS. 1 to 3).

BRIEF DESCRIPTION OF THE DRAWINGS

FIG. 2 shows an upscaled part-section of the measuring device integrated in the travel sensor; and FIG. 3 shows a sectional representation of the measuring element in FIG. 2.

DETAILED DESCRIPTION OF THE INVENTION

Figure 1:
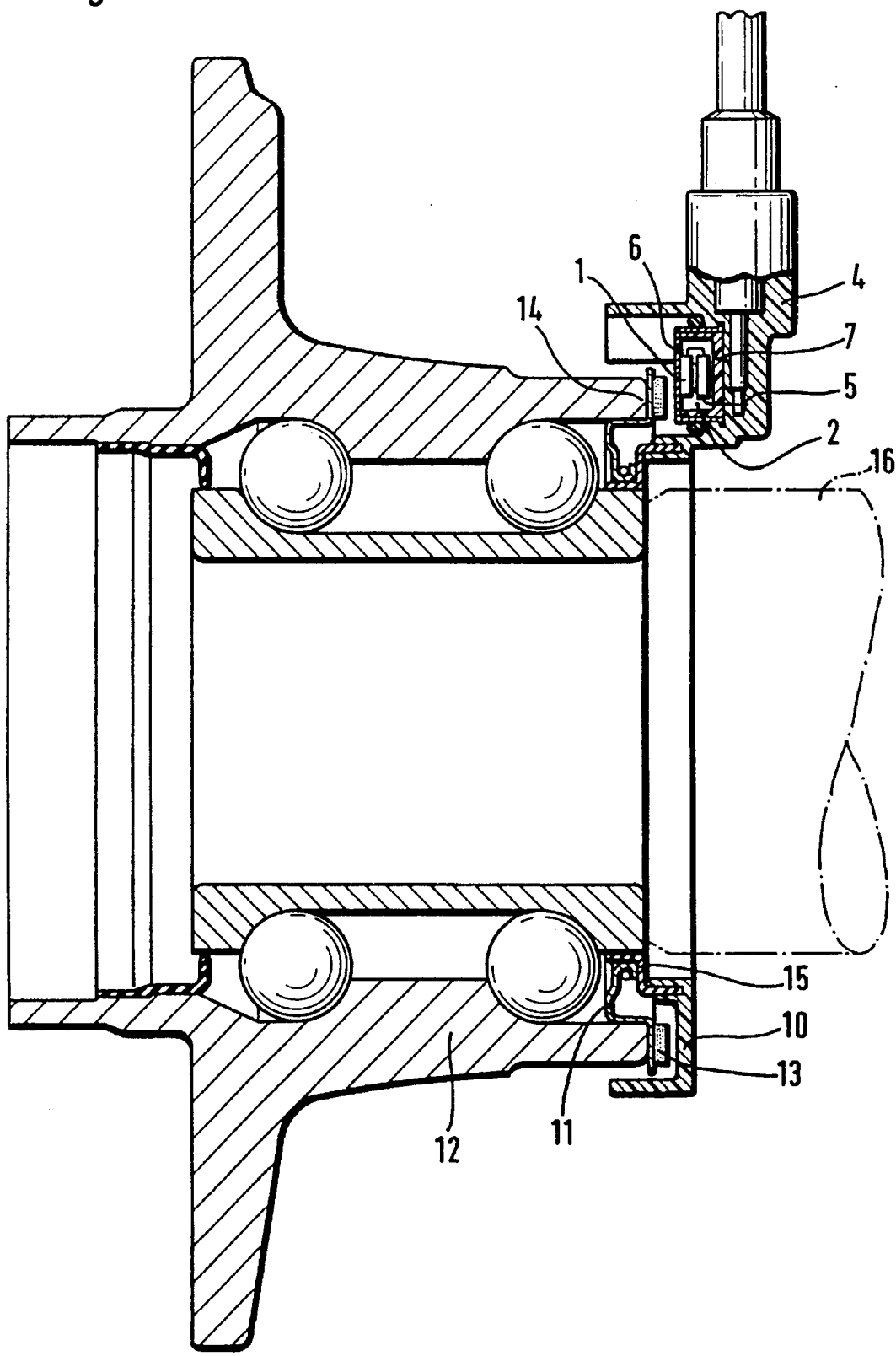
FIG. 1 shows an arrangement of the travel sensor with the impulse wheel at the wheel bearing.

FIG. 1 shows in a diagrammatic sketch a rotor 11 fabricated from a light-gauge sheet-steel stamping which is fixed as an impulse generator to the rotating part of the wheel bearing housing 12. In the illustration shown, said rotor 11 is furnished with a plurality of magnetic pole pairs 13 which are uniformly distributed over the circumference (so-called external magnetization) and which are fixed onto the rotor 11 configured in the shape of a sectional disc member in a positive locking-type engagement and/or in a frictional locking engagement. The cross-sectional profile of the rotor 11 is centered at the internal collar 14 of the wheel hub and is cranked z-shape in the direction of the wheel bearing in such a manner that the internal radius of the rotor 11 ends at the wheel bearing sealing ring 15. The carrier housing 4 which is configured in the shape of an injection moulding simultaneously overlaps the collar 14 of the wheel hub, so that any penetration of splash water and mud between the rotor 11 and the measuring device is virtually excluded. This section of the carrier housing 4 is configured as a protecting cap 10 for this purpose which when positioned at the driven vehicle axle as shown in the drawing is designed as a cover disc being penetrated, for example, by a wheel axle or by a driving shaft 16.

In lieu of a rotor being furnished with pairs of magnetic poles a conventional toothed rim may be used as well. However, in that case it will be necessary to accommodate a permanent magnet within the sensor housing (so-called internal magnetization), which may, indeed, lead to an increase of the overall space requirements of the sensor.

FIG. 2 shows the functionally and constructionally relevant elements of the sensor. The measuring element chamber 2 accommodating the measuring element 1 is formed by the two-part housing 3, one part of which being pluggable into the other, the one housing half being designed as a cup 6 and the other housing half as a cover 7 allowing to be pressed in and reaching down to the cup bottom. Advantageously, said cup 6 is configured in the shape of a thin-walled, non-ferromagnetic, deep-drawn metal element. In particular, the use of austenitic stainless steel is suited for this purpose for reasons of corrosion-resistance. Cover 7 is made of a high-strength plastic material with elevated melting point, for example of thermoset plastic. Through openings are provided in the cover 7 which are intended for the electric connections 5 coming from the measuring element 1, and from the IC module 8. The cartridge so constituted by the housing halves 6, 7, by the measuring element 1 accommodated therein and by the IC-type switching circuit is surrounded by the carrier housing 4.

Said carrier housing 4 is preferably fabricated by injection-coating of the two-part housing 3 with plastic material, the cover 7 absorbing the injection-coating pressure and preventing the penetration of plastic material into the measuring element chamber 2. A bus bar inserted in said plastic material establishes the electric connection between the connections of the IC and the peripheral plug-type connector. An additional protection against the penetration of water in the direction of the electric connections 5 of the IC module or semiconductor 8 is ensured by the sealing 9 which is pressed into the annular groove at the cup 6. The measuring element chamber 2 may, for example, be filled with silicon in order that the measuring element 1 and its IC module 8 are retained in the cup 6 without movement.

Beyond the advantages of the sensor which have already been mentioned and which regard its compactness, its lack of sensitivity to splash water and to mud, the described two-part housing 3 in the shape of the illustrated cartridge affords a universal application, independently of the structural requirements of the carrier housing 4.

Reference is now made to FIG. 3 which shows a top view of the two housing halves 3, which are formed by the cup 6 and by the cover 7, together with the measuring element 1 which may, for example, be configured as a Hall element for application of the Hall effect, and with the IC module 8 being arranged spacially on top. Said measuring element 1 and said IC module 8 are superimposed the way of plate-shaped layers and are interconnected through conductor foils 17 being configured as film hinges. On account of the special incorporating requirements the housing slightly differs from the circular housing shape, which becomes noticeable from the lateral flattening. In addition, the rectangular electric connections 5 are visible which are configurated in the shape of contact studs and which lead through the carrier housing 4.

I claim:

1. A sensor for the measurement of mechanical movement comprising:

a measuring element, a two-part housing including a cup and a cover, said cover being adapted to be plugged into said cup, said cup and said cover together defining a measuring element chamber containing said measuring element, said measuring element being fixed within said measuring element chamber, and a carrier housing injection-coating said two-part housing and at least partially surrounding the same, said two-part housing being provided with an annular groove circumscribing a wall of said cup to accommodate a seal for sealing said two-part housing within said carrier housing.

2. A sensor assembly for measuring mechanical movement representative of revolution rate of a wheel of an automotive vehicle, comprising:

a rotor coaxially attached to a rotating part of a wheel a measuring element, a two-part housing defining a measuring element chamber for containing said measuring element, said measuring element being fixed within said measuring element chamber, and a carrier housing being fixable relative to a wheel hub of an automotive vehicle and shaped to form a protective cup which covers said rotor, said carrier housing at least partially surrounding said two-part housing, said two-part housing being fixed within said carrier housing and being axially displaced relative to said rotor.

3. A method for manufacturing a sensor, comprising the steps of:

a) depositing a measuring element and an associated IC module connected therewith in a thin-walled metal cup;

b) enclosing said measuring element and said IC module in said cup using a relatively rigid cover made of plastic material having a high melting point in such a manner that said cover is pressed in said cup reaching down substantially to a bottom thereof, outer electric connections of said IC module coming to project through openings in said cover;

c) injection-coating said cup and said cover with a plastic material to form a carrier housing for fixing the sensor.

4. A sensor and a bearing combination for measurement of relative movement between an inner bearing member and an outer bearing member comprising:

an inner bearing member having an axis, an outer bearing member coaxially circumscribing said inner bearing member, a rotor located coaxially with said inner and said outer bearing members and adapted to follow movement of one of said bearing members relative to another of said bearing members, a measuring element perceiving said movement, a two-part housing defining a measuring element chamber containing said measuring element, said two-part housing entirely surrounding said measuring element, said measuring element being fixed within said measuring element chamber, and a carrier housing at least partially surrounding said two-part housing, said two-part housing being permanently fixed in said carrier housing and displaced from said axis.

5. A sensor as claimed in claim 4, wherein said two-part housing includes a cup and a cover fitting therein, and an annular groove is defined in the carrier housing circumscribing a wall of the cup and having a seal disposed in the annular groove.

6. A sensor as claimed in claim 4, wherein said carrier housing is fixed relative to a wheel hub of an automotive vehicle and is shaped to form a protective cap covering said rotor.

* * * * *